United States Patent
No

(10) Patent No.: US 10,093,297 B2
(45) Date of Patent: Oct. 9, 2018

(54) APPARATUS AND METHOD FOR CONTROLLING ELECTRIC PARKING BRAKE

(71) Applicant: MANDO CORPORATION, Gyeonggi-do (KR)

(72) Inventor: Su-Hwan No, Suwon-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 177 days.

(21) Appl. No.: 14/885,983

(22) Filed: Oct. 16, 2015

(65) Prior Publication Data

US 2016/0107623 A1    Apr. 21, 2016

(30) Foreign Application Priority Data

Oct. 21, 2014 (KR) .......................... 10-2014-0142515

(51) Int. Cl.
*B60T 17/22* (2006.01)

(52) U.S. Cl.
CPC ........... *B60T 17/22* (2013.01); *B60T 2270/86* (2013.01)

(58) Field of Classification Search
CPC .............................. B60T 17/22; B60T 2270/86
See application file for complete search history.

(56) References Cited

U.S. PATENT DOCUMENTS 7,244,003 B2   7/2007  Larson
8,041,475 B2   10/2011 Fujita et al.
(Continued)

FOREIGN PATENT DOCUMENTS

CN    103079915         5/2013
JP    2004102939 A  *  4/2004
(Continued)

OTHER PUBLICATIONS

Office Action dated Nov. 1, 2017 for Chinese Patent Application No. 201510685278.1 and its English machine translation by Global Dossier.

(Continued)

*Primary Examiner* — Jelani A Smith
*Assistant Examiner* — Kelly D Williams
(74) *Attorney, Agent, or Firm* — Ladas & Parry, LLP

(57) ABSTRACT

Disclosed herein are an apparatus and method for controlling an electric parking brake. The apparatus for controlling an electric parking brake includes a calculation unit which calculates, when a parking operation is clamped to park, based on a current disk temperature sensed in real time by a sensing apparatus, a current parking force loss amount after parking according to the current disk temperature in real time, a determination unit which determines whether the calculated current parking force loss amount is out of a preset reference parking force loss amount range, a driving unit which drives, when the current parking force loss amount is out of the reference parking force loss amount range, the electric parking brake to re-clamp the parking operation according to a target parking force range preset in the calculation unit, and a control unit which receives the current disk temperature, transmits a calculation command to the calculation unit, transmits a determination command to the determination unit, and transmits a driving command to the driving unit.

18 Claims, 11 Drawing Sheets

(56) References Cited

U.S. PATENT DOCUMENTS

2009/0198427 A1* 8/2009 Christopher Jackson .................. B60T 7/122
  701/70
2015/0120163 A1* 4/2015 Ohara .................. B60T 13/662
  701/70

FOREIGN PATENT DOCUMENTS

| JP | 2006-298191 | 11/2006 |
| JP | 2008-168785 | 7/2008 |
| JP | 4258558 | 4/2009 |
| JP | 4600133 | 12/2010 |
| KR | 10-2008-0012043 | 2/2008 |
| KR | 10-2013-0067170 | 6/2013 |
| KR | 10-1339245 | 1/2014 |

OTHER PUBLICATIONS

Office Action dated Jul. 24, 2015 for Korean Patent Appl. No. 10-2014-0142515.
Notice of Allowance dated Feb. 29, 2016 for Korean Patent Application No. 10-2014-0142515 and its English summary provided by Applicant's foreign counsel.
Office Action dated Jul. 5, 2018 for Chinese Patent Application No. 201510685278.1 and its English machine translation by Global Dossier.

* cited by examiner

FIG. 3

| Temp(℃) / Hill(%) | Theoretical Force(kgf) | Δforce | | | | | |
|---|---|---|---|---|---|---|---|
| | | 50℃ | 100℃ | 200℃ | 300℃ | 400℃ | 500℃ |
| 1% | 47 | 1170 | 1187 | 1146 | 1046 | 895 | 269 |
| 2% | 94 | 1123 | 1140 | 1099 | 999 | 849 | 222 ← A |
| 3% | 141 | 1076 | 1093 | 1052 | 952 | 802 | 175 |
| 4% | 188 | 1029 | 1046 | 1005 | 906 | 755 | 128 ← B |
| 5% | 235 | 982 | 999 | 958 | 859 | 708 | 81 |
| 6% | 281 | 936 | 953 | 912 | 812 | 661 | 35 |
| 7% | 328 | 889 | 906 | 865 | 765 | 614 | -12 |
| 8% | 375 | 842 | 859 | 818 | 719 | 568 | -59 |
| 9% | 421 | 796 | 813 | 772 | 672 | 521 | -105 ← C |
| 10% | 467 | 749 | 766 | 726 | 626 | 475 | -151 |
| 11% | 514 | 703 | 720 | 679 | 580 | 429 | -198 |
| 12% | 560 | 657 | 674 | 633 | 534 | 383 | -244 |
| 13% | 606 | 611 | 628 | 587 | 488 | 337 | -290 ← D |
| 14% | 651 | 566 | 583 | 542 | 442 | 291 | -335 |
| 15% | 697 | 520 | 537 | 496 | 396 | 246 | -381 |
| 16% | 742 | 475 | 492 | 451 | 351 | 200 | -426 |
| 17% | 787 | 429 | 447 | 406 | 306 | 155 | -471 |
| 18% | 832 | 385 | 402 | 361 | 261 | 110 | -516 ← E |
| 19% | 877 | 340 | 357 | 316 | 216 | 65 | -561 |
| 20% | 921 | 295 | 313 | 272 | 172 | 21 | -605 |
| 21% | 966 | 251 | 268 | 228 | 128 | -23 | -650 |
| 22% | 1009 | 207 | 224 | 184 | 84 | -67 | -693 |
| 23% | 1053 | 164 | 181 | 140 | 40 | -111 | -737 ← F |
| 24% | 1096 | 120 | 137 | 97 | -3 | -154 | -780 |
| 25% | 1139 | 77 | 94 | 54 | -46 | -197 | -823 |
| 26% | 1182 | 35 | 52 | 11 | -89 | -240 | -866 |
| 27% | 1225 | -8 | 9 | -32 | -131 | -282 | -909 |
| 28% | 1267 | -50 | -33 | -74 | -174 | -324 | -951 |
| 29% | 1309 | -92 | -75 | -115 | -215 | -366 | -993 |
| 30% | 1350 | -133 | -116 | -157 | -257 | -408 | -1034 |

ABSTRACT

APPARATUS AND METHOD FOR CONTROLLING ELECTRIC PARKING BRAKE

CROSS-REFERENCE TO RELATED APPLICATION

This application claims the benefit of Korean Patent Application No. 10-2014-0142515, filed on Oct. 21, 2014 in the Korean Intellectual Property Office, the disclosure of which is incorporated herein by reference.

BACKGROUND

1. Field

Embodiments of the present invention relate to an apparatus and method for controlling an electric parking brake.

2. Description of the Related Art

Generally, general electric parking brakes are driver-friendly automatic brake apparatuses in which a brake automatically operates when an ignition is turned off and the brake is automatically released when the ignition is turned on and an accelerator is hit, thereby improving convenience of parking.

However, in the case of general electric parking brakes, when a vehicle is parked with a disk at a currently high temperature, since a brake pad contracts as time goes by and a parking force decreases, it is difficult to efficiently maintain a parking function.

In such general electric parking brakes, since it is not smoothly performed to maintain a parking state after parking, there is a limit on improving convenience of parking.

Accordingly, an apparatus and method for controlling an electric parking brake, capable of improving convenience of parking without the need to continuously worry about whether a parking state is smoothly performed after parking, quickly performing an initial response by notifying a driver of instability of a current parking state, and more improving reliability of parking by notifying the driver of stability of the current parking state have been researched.

SUMMARY

Therefore, it is an aspect of the present invention to provide an apparatus and method for controlling an electric parking brake, capable of improving convenience of parking.

It is another aspect of the present invention to provide an apparatus and method for controlling an electric parking brake, capable of allowing a driver to recognize that a current parking state is unstable, thereby quickly performing an initial response.

It is still another aspect of the present invention to provide an apparatus and method for controlling an electric parking brake, capable of allowing a driver to recognize that a current parking state is stable, thereby more improving reliability of parking.

Additional aspects of the invention will be set forth in part in the description which follows and, in part, will be obvious from the description, or may be learned by practice of the invention.

In accordance with one aspect of the present invention, an apparatus for controlling an electric parking brake includes a calculation unit which calculates, when a parking operation is clamped to park, based on a current disk temperature sensed in real time by a sensing apparatus, a current parking force loss amount after parking according to the current disk temperature in real time, a determination unit which determines whether the calculated current parking force loss amount is out of a preset reference parking force loss amount range, a driving unit which drives, when the current parking force loss amount is out of the reference parking force loss amount range, the electric parking brake to re-clamp the parking operation according to a target parking force range preset in the calculation unit, and a control unit which receives the current disk temperature, transmits a calculation command to the calculation unit, transmits a determination command to the determination unit, and transmits a driving command to the driving unit.

The sensing apparatus may further sense a road surface inclination angle. Also, before the parking operation is applied to park, the calculation unit may further calculate a current parking force loss amount after parking according to the current disk temperature and the road surface inclination angle in real time based on the current disk temperature and the road surface inclination angle sensed in real time by the sensing apparatus.

When a brake pad contracts according to the current disk temperature, the calculation unit may calculate a current parking force loss amount caused by the contraction of the brake pad in real time.

The current disk temperature may be calculated using a temperature increase model caused by brake-frictional energy and a temperature cooling model caused by a convective process of an ambient temperature.

When determining whether the calculated current parking force loss amount is out of the reference parking force loss amount range, the determination unit may determine whether a current parking force is a reference parking force or less.

The calculation unit may calculate the current parking force loss amount in real time while maintaining power of the control unit even when an ignition of a vehicle is turned off.

The apparatus may further include a communication unit which communicates with a portable mobile communication terminal of a driver under control of the control unit. Herein, when the current parking force loss amount is out of the reference parking force loss amount range, the communication unit may transmit a communication signal to the portable mobile communication terminal of the driver to allow the portable mobile communication terminal of the driver to recognize that a current parking state is unstable.

The apparatus may further include a communication unit which communicates with a portable mobile communication terminal of a driver under control of the control unit. Herein, when the parking operation is re-clamped, the communication unit may transmit a communication signal to the portable mobile communication terminal of the driver to allow the portable mobile communication terminal of the driver to recognize that a current parking state is stable.

In accordance with another aspect of the present invention, a method of controlling an electric parking brake includes calculating, when a parking operation is clamped to park, based on a current disk temperature sensed in real time by a sensing apparatus, a current parking force loss amount after parking according to the current disk temperature in real time, determining whether the calculated current parking force loss amount is out of a preset reference parking force loss amount range, and driving the electric parking brake to re-clamp the parking operation according to a preset target parking force range when the current parking force loss amount is out of the reference parking force loss amount range.

The sensing apparatus may further sense a road surface inclination angle. Also, before the parking operation is applied to park, the calculating may further include calculating a current parking force loss amount after parking according to the current disk temperature and the road surface inclination angle in real time based on the current disk temperature and the road surface inclination angle sensed in real time by the sensing apparatus.

When a brake pad contracts according to the current disk temperature, the calculating may include calculating a current parking force loss amount caused by the contraction of the brake pad in real time.

The current disk temperature may be calculated using a temperature increase model caused by brake-frictional energy and a temperature cooling model caused by a convective process of an ambient temperature.

When determining whether the calculated current parking force loss amount is out of the reference parking force loss amount range, the determining may include determining whether a current parking force is a reference parking force or less.

The calculating may include calculating the current parking force loss amount in real time while maintaining power of a control unit even when an ignition of a vehicle is turned off.

The method may further include communicating with a portable mobile communication terminal of a driver under control of the control unit. Herein, when the current parking force loss amount is out of the reference parking force loss amount range, the communicating may include transmitting a communication signal to the portable mobile communication terminal of the driver to allow the portable mobile communication terminal of the driver to recognize that a current parking state is unstable.

The method may further include communicating with a portable mobile communication terminal of a driver under control of the control unit. Herein, when the parking operation is re-clamped, the communicating may include transmitting a communication signal to the portable mobile communication terminal of the driver to allow the portable mobile communication terminal of the driver to recognize that a current parking state is stable.

BRIEF DESCRIPTION OF THE DRAWINGS

These and/or other aspects of the invention will become apparent and more readily appreciated from the following description of the embodiments, taken in conjunction with the accompanying drawings of which:

FIG. 3 is a view illustrating a re-clamping table set by a calculation unit of FIG. 2;

DETAILED DESCRIPTION

Figure 1:
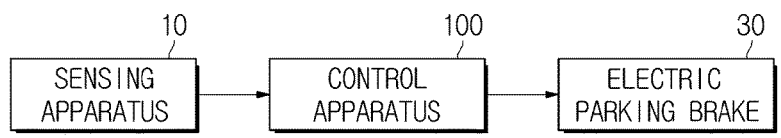
FIG. 1 is a block diagram illustrating a state in which a control apparatus is connected to a sensing apparatus and an electric parking brake according to a first embodiment of the present invention.

Reference will now be made in detail to the embodiments of the present invention, examples of which are illustrated in the accompanying drawings, wherein like reference numerals refer to like elements throughout.

Hereinafter, embodiments of the present invention will be described in detail with reference to the drawings. The following embodiments are provided to convey the concept of the present invention to a person of ordinary skill in the art. The present invention is not limited to the embodiments described below and may be embodied in other forms. In the drawings, for clarity, parts irrelevant to a description will be omitted and sizes of components may be slightly exaggerated for better understanding.

Figure 2:
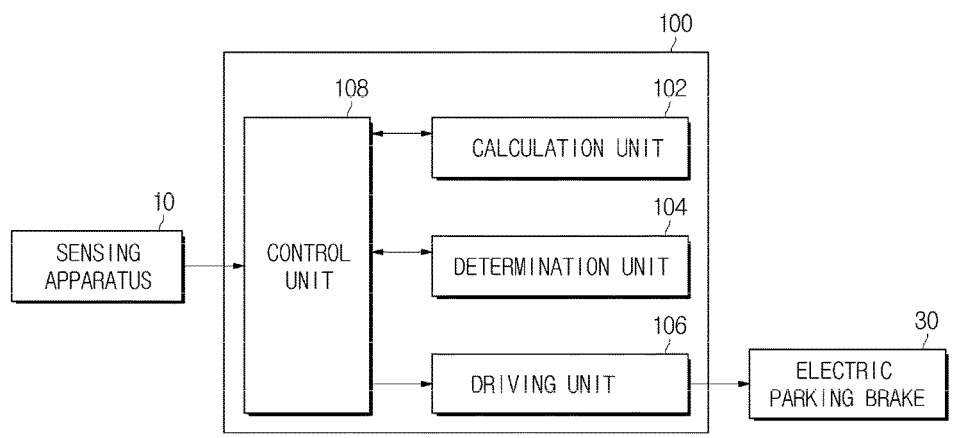
FIG. 2 is a block diagram illustrating an example of the control apparatus of FIG. 1.

FIG. 1 is a block diagram illustrating a state in which a control apparatus 100 is connected to a sensing apparatus 10 and an electric parking brake 30 according to a first embodiment of the present invention. FIG. 2 is a block diagram illustrating an example of the control apparatus 100 of FIG. 1.

Figure 4:
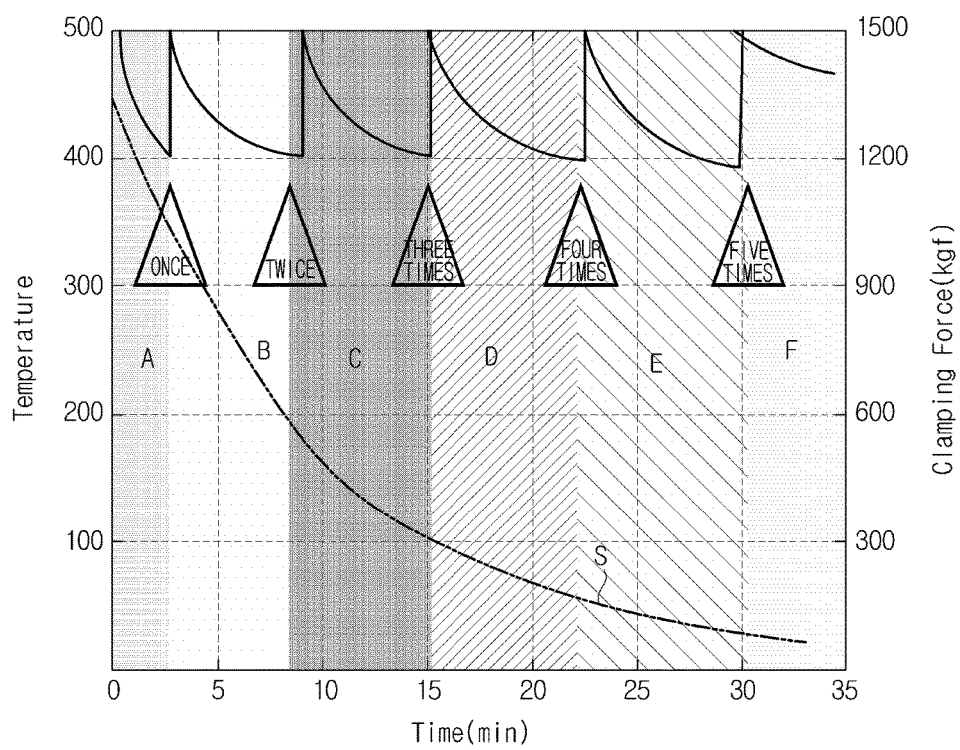
FIG. 4 is a graph illustrating numbers of clamping times to re-clamp according to the re-clamping table of FIG. 3.

FIG. 3 is a view illustrating a re-clamping table set by a calculation unit 102 of FIG. 2. FIG. 4 is a graph illustrating numbers of clamping times to re-clamp according to the re-clamping table of FIG. 3.

Referring to FIGS. 1 to 4, the control apparatus 100 of the electric parking brake 30 includes the calculation unit 102, a determination unit 104, a driving unit 106, and a control unit 108.

When a parking operation is clamped to park, based on a current disk temperature sensed in real time by the sensing apparatus 10, the calculation unit 102 calculates a current parking force loss amount after parking according to the current disk temperature in real time.

Also, before the parking operation is applied to park, based on a current disk temperature and an inclination angle of a road surface sensed in real time by the sensing apparatus 10, the calculation unit 102 may further calculate a current parking force loss amount after parking according to the current disk temperature and the inclination angle of the road surface in real time.

Here, when a brake pad contracts according to a current disk temperature, the calculation unit 102 may calculate a current parking force loss amount caused by the contraction of the brake pad in real time.

Here, the calculation unit 102 may calculate the current parking force loss amount in real time while maintaining power of the control unit 108 even when an ignition of a vehicle is turned off.

Here, the sensing apparatus 10 may include a temperature sensor (not shown) and a road surface inclination angle sensor (not shown) to sense a current disk temperature and an inclination angle of a road surface.

For example, the current disk temperature may be calculated using a temperature increase model formed by brake-frictional energy and a temperature cooling model formed by a convective process of an ambient temperature.

Here, the temperature increase model formed by the brake-frictional energy may be shown as following Equation 1.

$$E_{friction} = [\mu_{pad} \times P_{wheel} \times A_{cylinder}] \times \left[V_{wheel} \times \Delta t \times \frac{l_{disk}}{l_{wheel}}\right] \quad \text{Equation (1)}$$

$$\Delta T_{heat} = C_T \times \frac{E_{friction}}{m_{disk} \times c_{disk}}$$

Here, $E_{friction}$ indicates frictional energy, $\mu_{pad}$ indicates a friction factor of the brake pad, $P_{wheel}$ indicates a wheel pressure, $A_{cylinder}$ indicates a brake cylinder, $V_{wheel}$ indicates wheel speed, $l_{disk}$ indicates a circumference of a disk, $l_{wheel}$ indicates a circumference of a wheel, $\Delta T_{heat}$ indicates a heating temperature ratio, $C_T$ indicates a heat absorbing factor, $m_{disk}$ indicates the mass of the disk, and $c_{disk}$ indicates the heat of the disk.

Also, the temperature cooling model formed by the convective process of the ambient temperature may be shown as following Equation 2.

$$\Delta T_{cool} = A_{disk} \cdot H \cdot (T_{disk} - T_{air}) / (m_{disk} c_{disk}) \quad \text{Equation (2)}$$

$$H = \frac{\lambda \cdot c \cdot \left(\frac{V_{air} \cdot r_{wheel}}{v_{air}}\right)^n}{r_{wheel}}$$

Here, $\Delta T_{cool}$ indicates a cooling temperature ratio, $A_{disk}$ indicates an effective radius, H indicates a heat transfer coefficient of a convection current, $T_{disk}$ indicates a disk temperature, $T_{air}$ indicates an ambient temperature, $m_{disk}$ indicates the mass of the disk, $c_{disk}$ indicates the heat of the disk, $r_{wheel}$ indicates a wheel radius, $\lambda$ indicates a heat transfer ratio of air, c indicates a convective factor, $v_{air}$ indicates a kinematic viscosity coefficient, $v_{air}$ and indicates speed.

The determination unit 104 determines whether the current parking force loss amount calculated by the calculation unit 102 is out of a preset reference parking force loss amount range.

That is, the determination unit 104 may determine whether a current parking force is a reference parking force or less when it is determined whether the current parking force loss amount calculated by the calculation unit 102 is out of the reference parking force loss amount range.

Also, the determination unit 104 may estimate a number of re-clamping times necessary to reach a target parking force range when it is determined that the current parking force loss amount calculated by the calculation unit 102 is out of the reference parking force loss amount range.

For example, as shown in FIGS. 2 to 4, the determination unit 104 may estimate the number of re-clamping times necessary to reach the target parking force range using a clamping number graph according to a re-clamping table.

Here, as shown in FIG. 3, the re-clamping table may be set as a deficient parking force Δ force compared with a necessary parking force Theoretical Force after the contraction of the brake pad when it is cooled to a room temperature after parking based on a current disk temperature Temp and a road surface inclination angle Hill sensed in real time by the sensing apparatus 10.

Here, as shown in FIGS. 3 and 4, the target parking force range may be set six areas A, B, C, D, E, and F.

That is, since there is still present a full parking force after the loss of parking force caused by the contraction of the brake pad, the area A may be estimated as a state without need of re-clamping.

Also, since there is present a little parking force after the loss of parking force caused by the contraction of the brake pad, the area B may be estimated as a state in need of one time of re-clamping.

Since there is less parking force than the area B after the loss of parking force caused by the contraction of the brake pad, the area C may be estimated as a state in need of two times of re-clamping.

Since there is less parking force than the area C after the loss of parking force caused by the contraction of the brake pad, the area D may be estimated as a state in need of three times of re-clamping.

Since there is less parking force than the area D after the loss of parking force caused by the contraction of the brake pad, the area E may be estimated as a state in need of four times of re-clamping.

Since there is less parking force than the area E after the loss of parking force caused by the contraction of the brake pad, the area F may be estimated as a state in need of five times of re-clamping.

When the determination unit 104 determines that the current parking force loss amount is out of the reference parking force loss amount range, the driving unit 106 drives the electric parking brake 30 to re-clamp the parking operation according to the target parking force range preset in the calculation unit 102.

That is, when the determination unit 104 determines that the current parking force is the reference parking force or less, the driving unit 106 drives the electric parking brake 30 to re-clamp the parking operation according to the target parking force range preset in the calculation unit 102.

Here, when the number of performed re-clamping times is smaller than the number of re-clamping times estimated by the determination unit 104, the driving unit 106 may drive the electric parking brake 30 to re-clamp as many as the number of re-clamping times estimated by the determination unit 104.

For example, as shown in FIGS. 2 to 4, the driving unit 106 may drive the electric parking brake 30 to re-clamp the parking operation according to the target parking force range using the clamping number graph according to the re-clamping table.

Here, as shown in FIG. 3, the re-clamping table may be set as a deficient parking force Δ force compared with a necessary parking force Theoretical Force after the contraction of the brake pad when it is cooled to a room temperature after parking based on the current disk temperature Temp and the road surface inclination angle Hill sensed in real time by the sensing apparatus 10.

Here, as shown in FIGS. 3 and 4, the target parking force range may be set six areas A, B, C, D, E, and F.

That is, since there is still present a full parking force after the loss of parking force caused by the contraction of the brake pad, the area A may be estimated as a state without need of re-clamping. Also, since there is present a little parking force after the loss of parking force caused by the contraction of the brake pad, the area B may be estimated as a state in need of one time of re-clamping. Accordingly, when the driving unit 106 does not drive re-clamping even though the determination unit 104 estimates that one time of re-clamping is necessary, the electric parking brake 30 may be driven to one time re-clamp.

Since there is less parking force than the area B after the loss of parking force caused by the contraction of the brake pad, the area C may be estimated as a state in need of two times of re-clamping. Accordingly, when the driving unit 106 performs less than two times of re-clamping even though the determination unit 104 estimates that two times of re-clamping are necessary, the electric parking brake 30 may be driven to additionally re-clamp.

Since there is less parking force than the area C after the loss of parking force caused by the contraction of the brake pad, the area D may be estimated as a state in need of three times of re-clamping. Accordingly, when the driving unit 106 performs less than three times of re-clamping even though the determination unit 104 estimates that three times of re-clamping are necessary, the electric parking brake 30 may be driven to additionally re-clamp.

Since there is less parking force than the area D after the loss of parking force caused by the contraction of the brake pad, the area E may be estimated as a state in need of four times of re-clamping. Accordingly, when the driving unit 106 performs less than four times of re-clamping even though the determination unit 104 estimates that four times of re-clamping are necessary, the electric parking brake 30 may be driven to additionally re-clamp.

Since there is less parking force than the area E after the loss of parking force caused by the contraction of the brake pad, the area F may be estimated as a state in need of five times of re-clamping. Accordingly, when the driving unit 106 performs less than five times of re-clamping even though the determination unit 104 estimates that five times of re-clamping are necessary, the electric parking brake 30 may be driven to additionally re-clamp.

Accordingly, when re-clamping is performed less than the number of re-clamping times estimated in each area, it is possible to drive to re-clamp the estimated number of re-clamping times.

Here, as shown in FIGS. 2 and 4, the driving unit 106 may drive the electric parking brake 30 to re-clamp the parking operation one time to five times for the respective areas A, B, C, D, E, and F of the target parking force range in accordance with the parking force of 1200 kgf necessary for clamping when the current disk temperature sensed in real time by the sensing apparatus 10 is 400 degrees or more and is cooled to a room temperature after parking (S in FIG. 4).

The control unit 108 receives the current disk temperature, transmits a calculation command to the calculation unit 102, transmits a determination command to the determination unit 104, and transmits a driving command to the driving unit 106.

Here, the calculation unit 102, the determination unit 104, the driving unit 106, and the control unit 108 may be provided in a general electric control unit (ECU, not shown) which is a main computer applied to a vehicle for controlling the overall operations, calculating, determining, and driving the electric parking brake 30.

Also, the calculation unit 102, the determination unit 104, the driving unit 106, and the control unit 108 may be provided in a general micro control unit (MCU, not shown) which is a main computer applied to a vehicle for controlling the overall operations, calculating, determining, and driving the electric parking brake 30.

Also, the calculation unit 102, the determination unit 104, the driving unit 106, and the control unit 108 are not limited thereto but may be all types of control means, calculation means, determination means, and driving means capable of controlling the overall operations of the vehicle, calculating, determining, and driving the electric parking brake 30.

Here, the calculation unit 102, the determination unit 104, the driving unit 106, and the control unit 108 may be integrally provided or may be separately provided in the ECU or MCU.

Hereinafter, a method of controlling the electric parking brake 30 using the control apparatus 100 of the electric parking brake 30 according to the first embodiment of the present invention will be described with reference to FIGS. 5 and 6.

Figure 5:
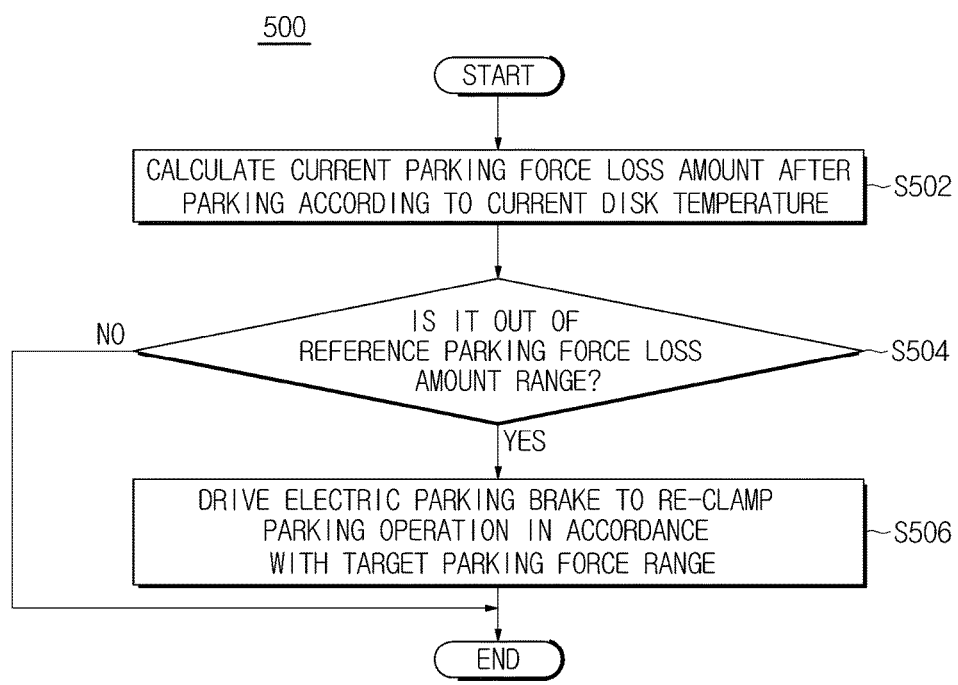
FIG. 5 is a flowchart illustrating an example of a method of controlling the electric parking brake using the control apparatus of the electric parking brake according to the first embodiment of the present invention.

FIG. 5 is a flowchart illustrating an example of the method of controlling the electric parking brake 30 using the control apparatus 100 of the electric parking brake 30 according to the first embodiment of the present invention. FIG. 6 is a flowchart illustrating another example of the method of controlling the electric parking brake 30 using the control apparatus 100 of the electric parking brake 30 according to the first embodiment of the present invention.

Figure 6:
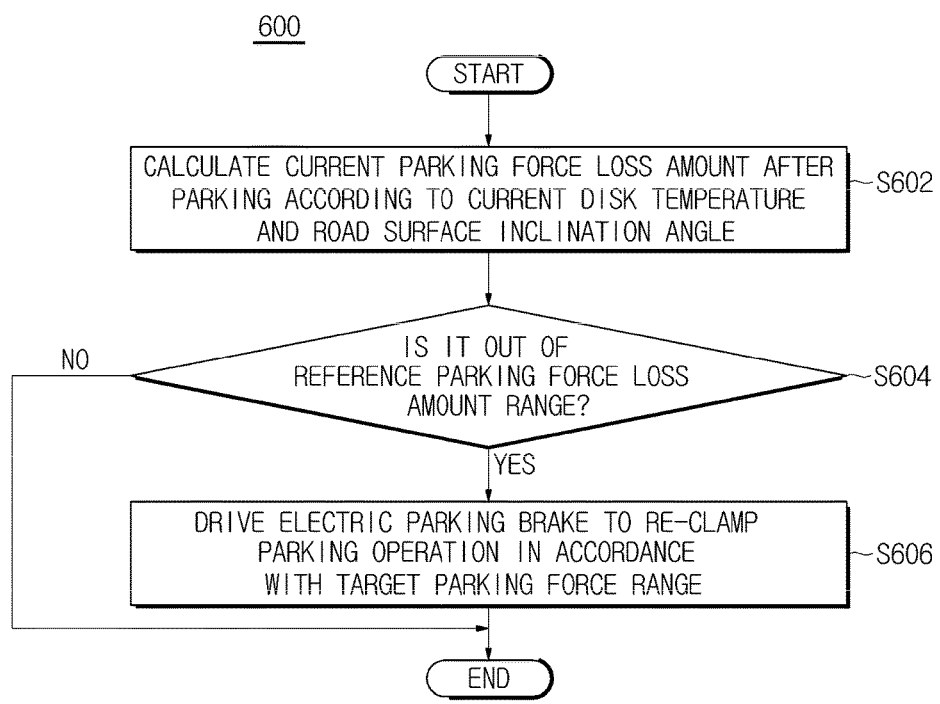
FIG. 6 is a flowchart illustrating another example of the method of controlling the electric parking brake using the control apparatus of the electric parking brake according to the first embodiment of the present invention.

Referring to FIGS. 5 and 6, methods 500 and 600 of controlling the electric parking brake 30 of FIGS. 1 and 2 using the control apparatus 100 of FIGS. 1 and 2 of the electric parking brake 30 according to the first embodiment of the present invention include calculating S502 and S602, determining S504 and S604, and driving S506 and S606, respectively.

First, as shown in FIG. 5, in the calculating S502, when a parking operation is clamped to park, based on a current disk temperature sensed in real time by the sensing apparatus 10 of FIG. 2, a current parking force loss amount after parking according to the current disk temperature is calculated in real time by the calculation unit 102 of FIG. 2 under control of the control unit 108 of FIG. 2.

On the other hand, as shown in FIG. 6, in the calculating S602, before a parking operation is applied to park, based on a current disk temperature and a road surface inclination angle sensed in real time by the sensing apparatus 10 of FIG. 2, a current parking force loss amount after parking according to the current disk temperature and the road surface inclination angle may be further calculated in real time by the calculation unit 102 of FIG. 2 under control of the control unit 108 of FIG. 2.

Here, in the calculating S502 and S602, when a brake pad contracts due to the current disk temperature, the current parking force loss amount caused by the contraction of the brake pad may be calculated in real time by the calculation unit 102 under control of the control unit 108.

Here, in the calculating S502 and S602, when an ignition of a vehicle is turned off, the current parking force loss amount may be calculated in real time by the calculation unit 102 under control of the control unit 108 while maintaining power of the control unit 108.

For example, the current disk temperature may be calculated using a temperature increase model formed by brake-frictional energy and a temperature cooling model formed by a convective process of an ambient temperature.

Here, the temperature increase model formed by the brake-frictional energy may be shown as following Equation 1.

$$E_{friction} = [\mu_{pad} \times P_{wheel} \times A_{cylinder}] \times \left[ V_{wheel} \times \Delta t \times \frac{l_{disk}}{l_{wheel}} \right] \quad \text{Equation (1)}$$

$$\Delta T_{heat} = C_T \times \frac{E_{friction}}{m_{disk} \times c_{disk}}$$

Here, $E_{friction}$ indicates frictional energy, $\mu_{pad}$ indicates a friction factor of the brake pad, $P_{wheel}$ indicates a wheel pressure, $A_{cylinder}$ indicates a brake cylinder, $V_{wheel}$ indicates wheel speed, $l_{disk}$ indicates a circumference of a disk, $l_{wheel}$ indicates a circumference of a wheel, $\Delta T_{heat}$ indicates a heating temperature ratio, $C_T$ indicates a heat absorbing factor, $m_{disk}$ indicates the mass of the disk, and $c_{disk}$ indicates the heat of the disk.

Also, the temperature cooling model formed by the convective process of the ambient temperature may be shown as following Equation 2.

$$\Delta T_{cool} = A_{disk} \cdot H \cdot (T_{disk} - T_{air})/(m_{disk}c_{disk}) \quad \text{Equation (2)}$$

$$H = \frac{\lambda \cdot c \cdot \left( \frac{V_{air} \cdot r_{wheel}}{v_{air}} \right)^n}{r_{wheel}}$$

Here, $\Delta T_{cool}$ indicates a cooling temperature ratio, $A_{disk}$ indicates an effective radius, H indicates a heat transfer coefficient of a convection current, $T_{disk}$ indicates a disk temperature, $T_{air}$ indicates an ambient temperature, $m_{disk}$ indicates the mass of the disk, $c_{disk}$ indicates the heat of the disk, $r_{wheel}$ indicates a wheel radius, $\lambda$ indicates a heat transfer ratio of air, c indicates a convective factor, $v_{air}$ indicates a kinematic viscosity coefficient, and $v_{air}$ indicates speed.

Next, in the determining S504 and S604, it is determined by the determination unit 104 of FIG. 2 under control of the control unit 108 whether the current parking force loss amount calculated by the calculation unit 102 is out of a preset reference parking force loss amount range.

That is, in the determining S504 and S604, when it is determined whether the current parking force loss amount calculated by the calculation unit 102 is out of the reference parking force loss amount range, it may be determined by the determination unit 104 under control of the control unit 108 whether a current parking force is a reference parking force or less.

Also, in the determining S504 and S604, a number of re-clamping times necessary to reach a target parking force range may be estimated when it is determined that the current parking force loss amount calculated by the calculation unit 102 is out of the reference parking force loss amount range.

Next, in the driving S506 and S606, when the determination unit 104 determines that the current parking force loss amount is out of the reference parking force loss amount range, the driving unit 106 of FIG. 2 drives the electric parking brake 30 under control of the control unit 108 to re-clamp the parking operation in accordance with the target parking force range preset in the calculation unit 102.

That is, in the driving S506 and S606, when the determination unit 104 determines that a current parking force is a reference parking force or less, the driving unit 106 may drive the electric parking brake 30 under control of the control unit 108 to re-clamp the parking operation in accordance with the target parking force range preset in the calculation unit 102.

For example, in the driving S506 and S606, the driving unit 106 may drive the electric parking brake 30 under control of the control unit 108 to re-clamp the parking operation in accordance with the target parking force range using the clamping number graph in FIG. 4 according to the re-clamping table in FIG. 3.

Here, the re-clamping table may be set as a deficient parking force Δ force in FIG. 3 compared with a necessary parking force Theoretical Force in FIG. 3 after the brake pad contracts when cooled to a room temperature after parking based on a current disk temperature Temp in FIG. 3 and a road surface inclination angle Hill in FIG. 3.

Here, the target parking force range may be set six areas A, B, C, D, E, and F as shown in FIGS. 3 and 4.

That is, since there is still present a full parking force after the loss of parking force caused by the contraction of the brake pad, the area A may be estimated as a state without need of re-clamping. Since there is present a little parking force after the loss of parking force caused by the contraction of the brake pad, the area B may be estimated as a state in need of one time of re-clamping. Accordingly, when the driving unit 106 does not drive re-clamping even though the determination unit 104 estimates that one time of re-clamping is necessary, the electric parking brake 30 may be driven to one time re-clamp.

Since there is less parking force than the area B after the loss of parking force caused by the contraction of the brake pad, the area C may be estimated as a state in need of two times of re-clamping. Accordingly, when the driving unit 106 performs less than two times of re-clamping even though the determination unit 104 estimates that two times of re-clamping are necessary, the electric parking brake 30 may be driven to additionally re-clamp.

Since there is less parking force than the area C after the loss of parking force caused by the contraction of the brake pad, the area D may be estimated as a state in need of three times of re-clamping. Accordingly, when the driving unit 106 performs less than three times of re-clamping even though the determination unit 104 estimates that three times of re-clamping are necessary, the electric parking brake 30 may be driven to additionally re-clamp.

Since there is less parking force than the area D after the loss of parking force caused by the contraction of the brake pad, the area E may be estimated as a state in need of four times of re-clamping. Accordingly, when the driving unit 106 performs less than four times of re-clamping even though the determination unit 104 estimates that four times of re-clamping are necessary, the electric parking brake 30 may be driven to additionally re-clamp.

Since there is less parking force than the area E after the loss of parking force caused by the contraction of the brake pad, the area F may be estimated as a state in need of five times of re-clamping. Accordingly, when the driving unit 106 performs less than five times of re-clamping even though the determination unit 104 estimates that five times of re-clamping are necessary, the electric parking brake 30 may be driven to additionally re-clamp.

Accordingly, when re-clamping is performed less than the number of re-clamping times estimated in each area, it is possible to drive to re-clamp the estimated number of re-clamping times.

Here, in the driving S506 and S606, the driving unit 106 may drive the electric parking brake 30 under control of the control unit 108 to re-clamp the parking operation one time to five times for the respective areas A, B, C, D, E, and F of the target parking force range in accordance with the parking force of 1200 kgf necessary for clamping (clamping force in FIG. 4) when the current disk temperature sensed in real time by the sensing apparatus 10 is 400 degrees or more and is cooled to the room temperature after parking (S in FIG. 4).

As described above, the control apparatus 100 and the method 500 or 600 for controlling the electric parking brake 30 according to the first embodiment of the present invention includes the calculation unit 102, the determination unit 104, the driving unit 106, and the control unit 108 and performs the calculating S502 or S602, the determining S504 or S604, and the driving S506 or S606, respectively.

Accordingly, when the parking operation is clamped to park, the control apparatus 100 and the method 500 or 600 for controlling the electric parking brake 30 according to the first embodiment of the present invention may calculate, based on the current disk temperature sensed in real time, the current parking force loss amount after parking according to the current disk temperature in real time and may re-clamp the parking operation in accordance with the target parking force range when the calculated current parking force loss amount is out of the reference parking force loss amount.

Accordingly, since it is unnecessary to continuously check whether a parking state is smoothly performed after parking, the control apparatus 100 and the method 500 or 600 for controlling the electric parking brake 30 according to the first embodiment of the present invention may improve convenience of parking.

Figure 7:
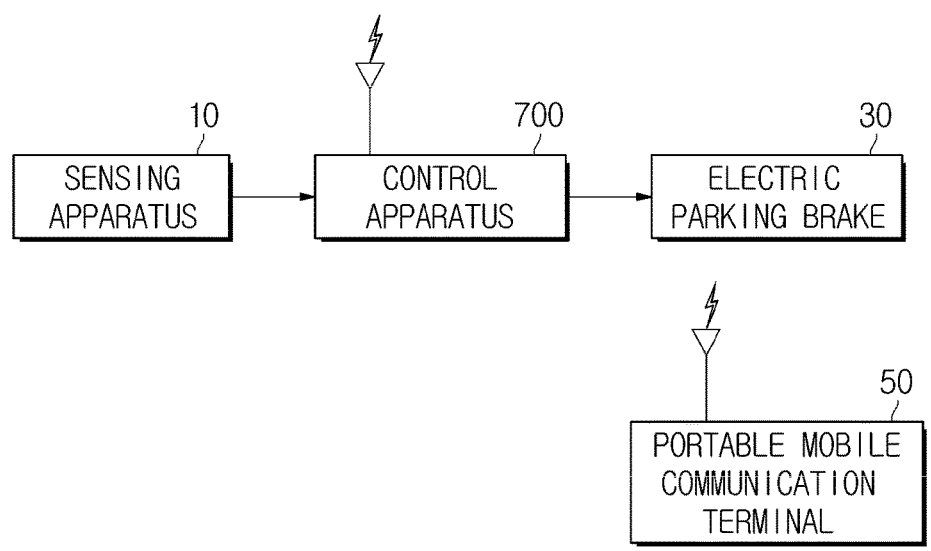
FIG. 7 is a block diagram illustrating a state in which a control apparatus is connected to a sensing apparatus and an electric parking brake and communicates with a portable mobile communication terminal according to a second embodiment of the present invention.
Figure 8:
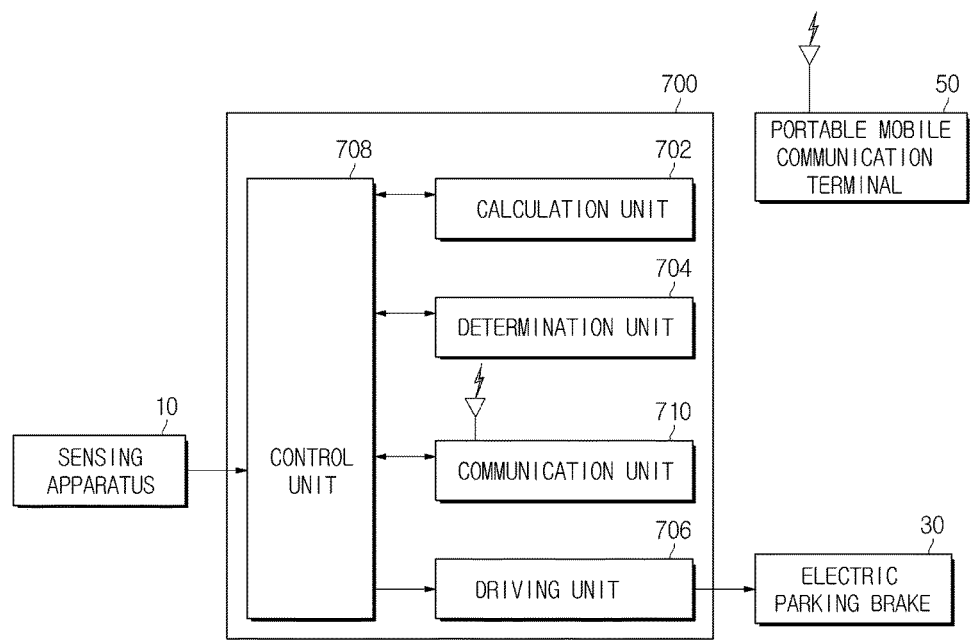
FIG. 8 is a block diagram illustrating an example of the control apparatus of FIG. 7.

FIG. 7 is a block diagram illustrating a state in which a control apparatus 700 is connected to the sensing apparatus 10 and the electric parking brake 30 and communicates with a portable mobile communication terminal according to a second embodiment of the present invention. FIG. 8 is a block diagram illustrating an example of the control apparatus 700 of FIG. 7.

Referring to FIGS. 7 and 8, the control apparatus 700 for the electric parking brake 30 according to the second embodiment of the present invention includes a calculation unit 702, a determination unit 704, a driving unit 706, and a control unit 708, like the control apparatus 100 for the electric parking brake 30 according to the first embodiment of the present invention.

Since functions and organic connections of the calculation unit 702, the determination unit 704, the driving unit 706, and the control unit 708 of the control apparatus 700 for the electric parking brake 30 according to the second embodiment of the present invention are identical to functions and organic connections of the calculation unit 102, the determination unit 104, the driving unit 106, and the control unit 108 of the control apparatus 100 for the electric parking brake 30 according to the first embodiment of the present invention, a detailed description thereof will be omitted.

Here, the control apparatus 700 for the electric parking brake 30 according to the second embodiment of the present invention further includes a communication unit 710.

That is, when the determination unit 704 determines that a current parking force loss amount is out of a reference parking force loss amount range, the communication unit 710 transmits a communication signal to a portable mobile communication terminal 50 of a driver under control of the control unit 708 to allow the portable mobile communication terminal 50 of the driver to recognize that a current parking state is unstable.

In other words, when the determination unit 704 determines that a current parking force is a reference parking force or less, the communication unit 710 may transmit the communication signal to the portable mobile communication terminal 50 of the driver under control of the control unit 708 to allow the portable mobile communication terminal 50 of the driver to recognize that the current parking state is unstable.

Also, when the driving unit 706 re-clamps a parking operation, the communication unit 710 may transmit a communication signal to the portable mobile communication terminal 50 of the driver under control of the control unit 708 to allow the portable mobile communication terminal 50 of the driver to recognize that the current parking state is stable.

Here, the communication unit 710 may include at least one of a wireless fidelity (Wi-Fi) module (not shown), a Zigbee module (not shown), a wireless broadband Internet (Wibro) module (not shown), a Wi-Max module (not shown), a long term evolution (LET) module (not shown), and an LTE-Advanced module (not shown) and may communicate with the portable mobile communication terminal 50.

Here, the portable mobile communication terminal 50 may be one of a personal digital assistant (PDA) (not shown), a smart phone (not shown), a tablet personal computer (PC) (not shown), a cellular phone (not shown), and a laptop PC (not shown).

Hereinafter, a method of controlling the electric parking brake 30 using the control apparatus 700 of the electric parking brake 30 according to the second embodiment of the present invention will be described with reference to FIGS. 9 to 12.

Figure 9:
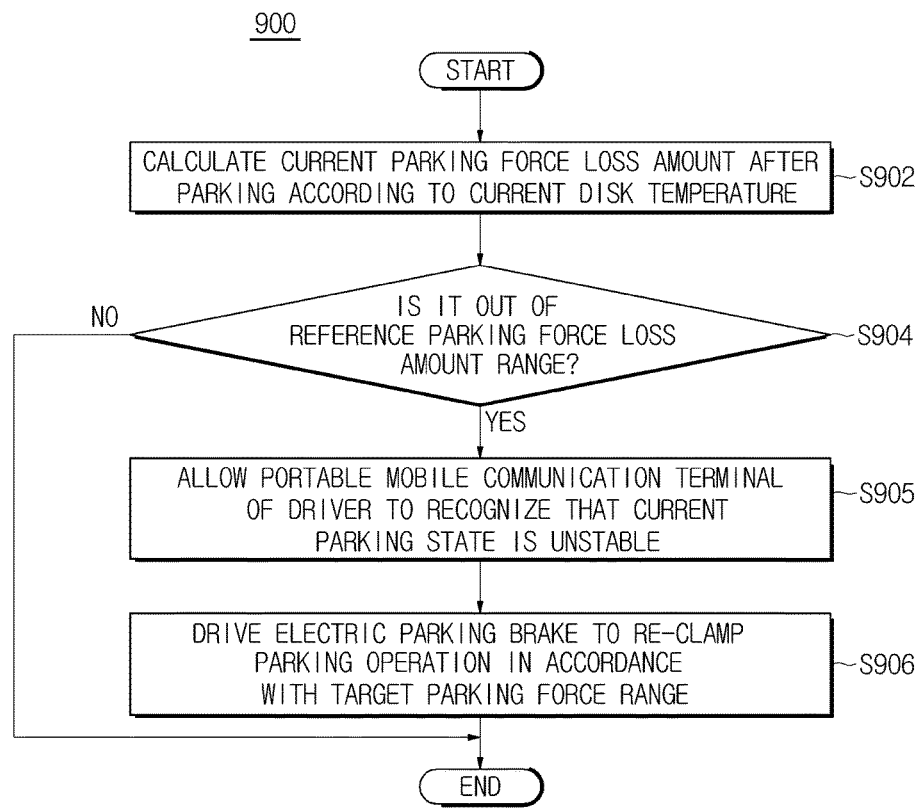
FIG. 9 is a flowchart illustrating an example of a method of controlling the electric parking brake using the control apparatus of the electric parking brake according to the second embodiment of the present invention.
Figure 10:
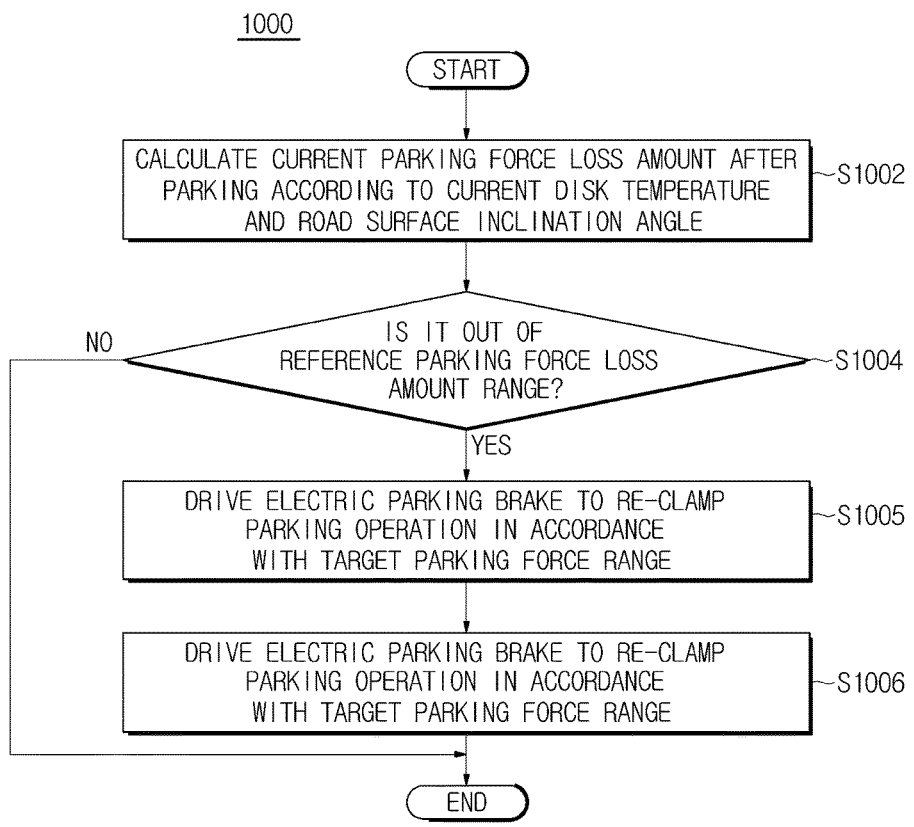
FIG. 10 is a flowchart illustrating another example of the method of controlling the electric parking brake using the control apparatus of the electric parking brake according to the second embodiment of the present invention.

FIG. 9 is a flowchart illustrating an example of the method of controlling the electric parking brake 30 using the control apparatus 700 of the electric parking brake 30 according to the second embodiment of the present invention. FIG. 10 is a flowchart illustrating another example of the method of controlling the electric parking brake 30 using the control apparatus 700 of the electric parking brake 30 according to the second embodiment of the present invention.

Figure 11:
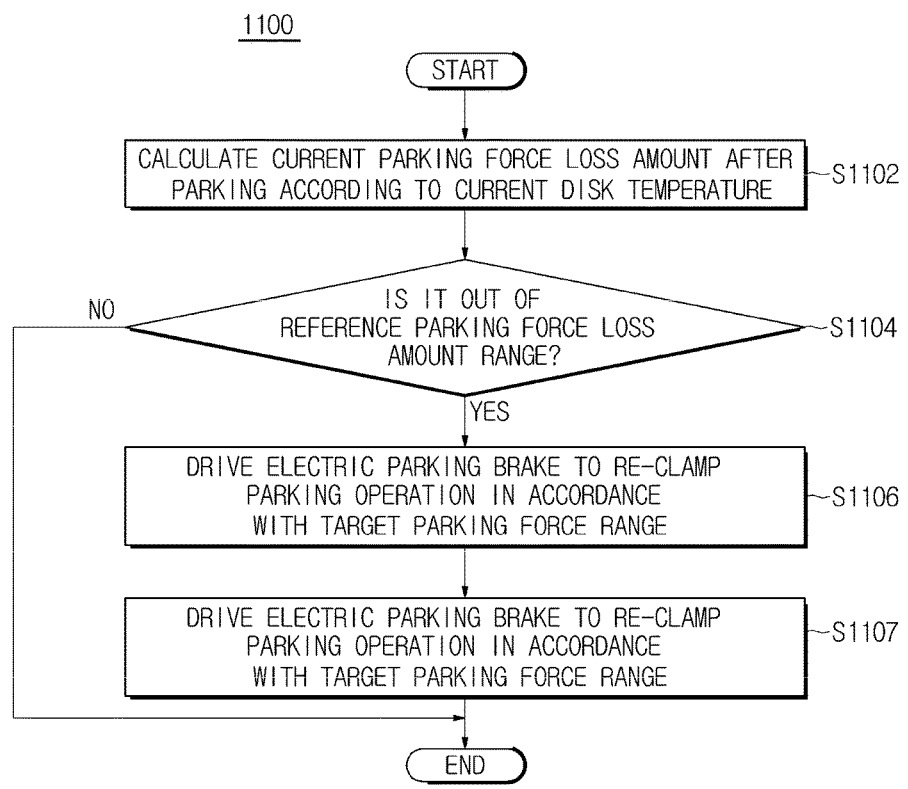
FIG. 11 is a flowchart illustrating still another example of the method of controlling the electric parking brake using the control apparatus of the electric parking brake according to the second embodiment of the present invention.
Figure 12:
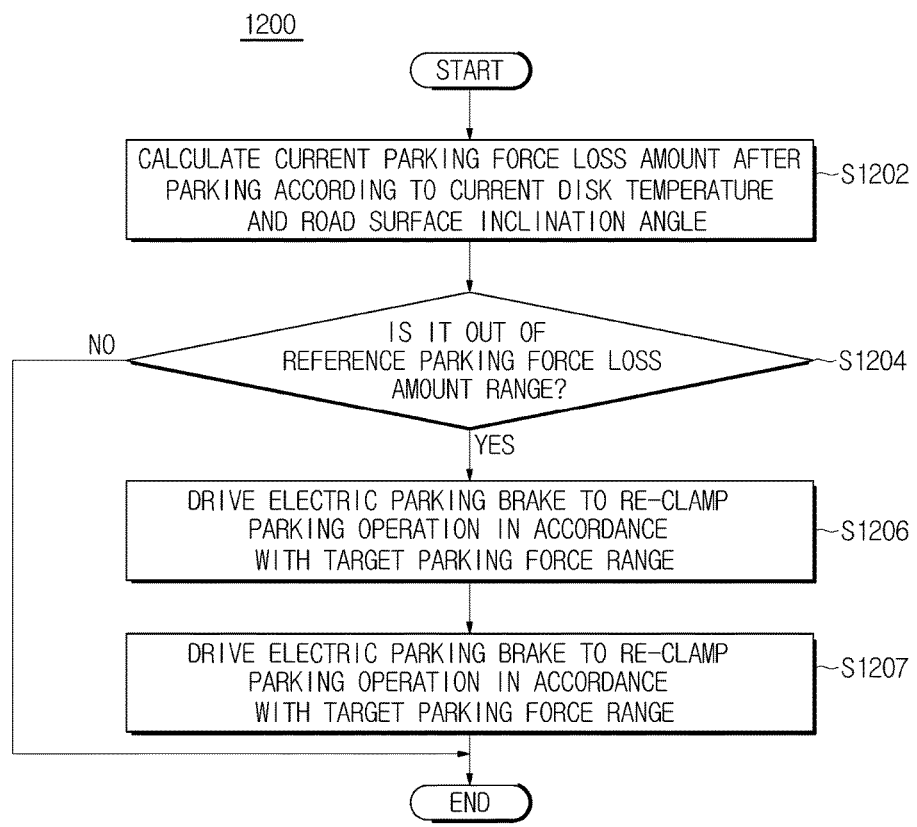
FIG. 12 is a flowchart illustrating yet another example of the method of controlling the electric parking brake using the control apparatus of the electric parking brake according to the second embodiment of the present invention.

FIG. 11 is a flowchart illustrating still another example of the method of controlling the electric parking brake 30 using the control apparatus 700 of the electric parking brake 30 according to the second embodiment of the present invention. FIG. 12 is a flowchart illustrating yet another example of the method of controlling the electric parking brake 30 using the control apparatus 700 of the electric parking brake 30 according to the second embodiment of the present invention.

Referring to FIGS. 9 to 12, the methods 900 to 1200 of controlling the electric parking brake 30 in FIGS. 7 and 8 using the control apparatus 700 in FIGS. 7 and 8 for the electric parking brake 30 according to the second embodiment of the present invention include calculating S902 to S1202, determining S904 to S1204, and driving S906 to S1206, respectively, like the methods 500 and 600 of controlling the electric parking brake 30 in FIGS. 1 and 2 using the control apparatus 100 in FIGS. 1 and 2 for the electric parking brake 30 according to the first embodiment of the present invention.

Since functions and organic connections of the calculating S902 to S1202, the determining S904 to S1204, and the driving S906 to S1206 of the methods 900 to 1200 of controlling the electric parking brake 30 using the control apparatus 700 for the electric parking brake 30 according to the second embodiment of the present invention are identical to functions and organic connections of the calculating S502 and S602 in FIGS. 5 and 6, the determining S504 and S604, and the driving S506 and S606 of the methods 500 and 600 of controlling the electric parking brake 30 using the control apparatus 100 for the electric parking brake 30 according to the first embodiment of the present invention, a detailed description thereof will be omitted.

Here, the methods 900 to 1200 of controlling the electric parking brake 30 using the control apparatus 700 for the electric parking brake 30 according to the second embodiment of the present invention further include communicating S905, S1005, S1107, and S1207.

For example, the communicating S905 and S1005 may be performed after the determining S904 and S1004 and may be performed while synchronized with driving (not shown).

As another example, the communicating S1107 and S1207 may be performed after the driving S1106 and S1206 and may be performed while synchronized with driving (not shown).

That is, as shown in FIGS. 9 and 10, in the communicating S905 and S1005, when the determination unit 704 of FIG. 8 determines that a current parking force loss amount is out of a reference parking force loss amount range, the communication unit 710 of FIG. 8 transmits a communication signal to the portable mobile communication terminal 50 of FIG. 8 of a driver under control of the control unit 708 of FIG. 8 to allow the portable mobile communication terminal 50 of the driver to recognize that a current parking state is unstable.

In other words, in the communicating S905 and S1005, when the determination unit 704 determines that a current parking force is a reference parking force or less, the communication unit 710 may transmit the communication signal to the portable mobile communication terminal 50 of the driver under control of the control unit 708 to allow the portable mobile communication terminal 50 of the driver to recognize that the current parking state is unstable.

Also, as shown in FIGS. 11 and 12, in the communicating S1107 and S1207, when the driving unit 706 of FIG. 8 re-clamp the parking operation, the communication unit 710 may transmit a communication signal to the portable mobile communication terminal 50 of the driver under control of the control unit 708 to allow the portable mobile communication terminal 50 of the driver to recognize that the current parking state is stable.

As described above, the control apparatus 700 and the methods 900 to 1200 for controlling the electric parking brake 30 according to the second embodiment of the present invention includes the calculation unit 702, the determination unit 704, the driving unit 706, the control unit 708, and the communication unit 710 and perform the calculating S902 to S1202, the determining S904 to S1204, the driving S906 to S1206, and the communicating S905, S1005, S1107, and S1207, respectively.

Accordingly, since it is unnecessary to continuously check whether a parking state is smoothly performed after parking, the control apparatus 700 and the methods 900 to 1200 for controlling the electric parking brake 30 according to the second embodiment of the present invention may improve convenience of parking.

Also, in the control apparatus 700 and the methods 900 to 1200 for controlling the electric parking brake 30 according to the second embodiment of the present invention, when the current parking force loss amount is out of the reference parking force loss amount range, the portable mobile communication terminal 50 recognizes that the current parking state is unstable in such a way that the driver may recognize that the current parking state is unstable and may quickly perform an initial response.

Also, in the control apparatus 700 and the methods 900 to 1200 for controlling the electric parking brake 30 according to the second embodiment of the present invention, when the parking operation is re-clamped, the portable mobile communication terminal 50 recognizes that the current parking state is stable in such a way that the driver may recognize that the current parking state is stable and the reliability of parking may be more increased.

As is apparent from the above description, an apparatus and method for controlling an electric parking brake in accordance with one embodiment of the present invention may improve convenience of parking.

Also, the apparatus and method may allow a driver to recognize that a current parking state is unstable, thereby quickly performing an initial response.

Also, the apparatus and method may allow a driver to recognize that a current parking state is stable, thereby more improving reliability of parking.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for controlling a parking brake, comprising:
  a sensing apparatus sensing a current disk temperature in real time;
  a calculation unit calculating the current disk temperature using a temperature increase model associated with brake-frictional energy and a temperature cooling model associated with a convective process of an ambient temperature, and calculating, when the parking brake is clamped to park, based on the sensed or calculated current disk temperature, a current parking force loss amount after parking according to the sensed or calculated current disk temperature in real time;
  a determination unit determining whether the calculated current parking force loss amount is out of a preset reference parking force loss amount range; and
  a driving unit re-clamping, when the current parking force loss amount is out of the reference parking force loss amount range, the parking brake according to a target parking force range preset in the calculation unit,
  wherein the temperature increase model considers at least one of frictional energy, a friction factor of a brake pad, a wheel pressure, a brake cylinder, wheel speed, a circumference of a disk, a circumference of a wheel, a heating temperature ratio, a heat absorbing factor, mass of the disk and heat of the disk, and wherein the temperature cooling model considers a cooling temperature ratio, an effective radius, a heat transfer coefficient of a convection current, a disk temperature, an ambient temperature, the mass of the disk, the heat of the disk, a wheel radius, a heat transfer ratio of air, a convective factor, a kinematic viscosity coefficient and speed.

2. The apparatus of claim 1, wherein the sensing apparatus further senses a road surface inclination angle, and
  wherein before the parking brake is applied to park, the calculation unit further calculates a current parking force loss amount after parking according to the sensed or calculated current disk temperature and the road surface inclination angle in real time based on the sensed or calculated current disk temperature and the road surface inclination angle sensed in real time by the sensing apparatus.

3. The apparatus of claim 1, wherein when a brake pad contracts according to the current disk temperature, the calculation unit calculates a current parking force loss amount caused by the contraction of the brake pad in real time.

4. The apparatus of claim 1, wherein when determining whether the calculated current parking force loss amount is out of the reference parking force loss amount range, the determination unit determines whether a current parking force is a reference parking force or less.

5. The apparatus of claim 2, wherein the determination unit estimates a number of re-clamping times necessary to reach the preset target parking force range.

6. The apparatus of claim 5, wherein the driving unit re-clamps the parking brake according to the estimated number of re-clamping times.

7. The apparatus of claim 1, wherein the calculation unit calculates the current parking force loss amount in real time while maintaining power of a control unit even when an ignition of a vehicle is turned off, wherein the control unit receives the current disk temperature, transmits a calculation command to the calculation unit, transmits a determination command to the determination unit, and transmits a driving command to the driving unit.

8. The apparatus of claim 1, further comprising a communication unit under control of a control unit which communicates with a portable mobile communication terminal of a driver, wherein the control unit receives the current disk temperature, transmits a calculation command to the calculation unit, transmits a determination command to the determination unit, and transmits a driving command to the driving unit, and
wherein when the current parking force loss amount is out of the reference parking force loss amount range, the communication unit transmits a communication signal to the portable mobile communication terminal of the driver to allow the portable mobile communication terminal of the driver to recognize that a current parking state is unstable.

9. The apparatus of claim 1, further comprising a communication unit under control of the control unit which communicates with a portable mobile communication terminal of a driver, wherein the control unit receives the current disk temperature, transmits a calculation command to the calculation unit, transmits a determination command to the determination unit, and transmits a driving command to the driving unit, and
wherein when the parking brake is re-clamped, the communication unit transmits a communication signal to the portable mobile communication terminal of the driver to allow the portable mobile communication terminal of the driver to recognize that a current parking state is stable.

10. A method of controlling a parking brake, comprising:
sensing, by a sensing apparatus, a current disk temperature in real time;
calculating the current disk temperature using a temperature increase model associated with brake-frictional energy and a temperature cooling model associated with a convective process of an ambient temperature;
calculating, when the parking brake is clamped to park, based on the sensed or calculated current disk temperature, a current parking force loss amount after parking according to the sensed or calculated current disk temperature in real time;
determining whether the calculated current parking force loss amount is out of a preset reference parking force loss amount range; and
re-clamping the parking brake according to a preset target parking force range when the current parking force loss amount is out of the reference parking force loss amount range,
wherein the temperature increase model considers at least one of frictional energy, a friction factor of a brake pad, a wheel pressure, a brake cylinder, wheel speed, a circumference of a disk, a circumference of a wheel, a heating temperature ratio, a heat absorbing factor, mass of the disk and heat of the disk, and wherein the temperature cooling model considers a cooling temperature ratio, an effective radius, a heat transfer coefficient of a convection current, a disk temperature, an ambient temperature, the mass of the disk, the heat of the disk, a wheel radius, a heat transfer ratio of air, a convective factor, a kinematic viscosity coefficient and speed.

11. The method of claim 10, wherein the sensing apparatus further senses a road surface inclination angle; and
wherein before the parking brake is applied to park, the calculating the current parking force loss amount further comprises calculating a current parking force loss amount after parking according to the sensed or calculated current disk temperature and the road surface inclination angle in real time based on the sensed or calculated current disk temperature and the road surface inclination angle sensed in real time by the sensing apparatus.

12. The method of claim 10, wherein when a brake pad contracts according to the current disk temperature, the calculating the current parking force loss amount comprises calculating a current parking force loss amount caused by the contraction of the brake pad in real time.

13. The method of claim 10, wherein when determining whether the calculated current parking force loss amount is out of the reference parking force loss amount range, the determining comprises determining whether a current parking force is a reference parking force or less.

14. The method of claim 11, wherein the determining further comprises estimating a number of re-clamping times necessary to reach the preset target parking force range.

15. The method of claim 14, wherein the re-clamping further comprises re-clamping the parking brake according to the estimated number of re-clamping times.

16. The method of claim 10, wherein the calculating the current parking force loss amount comprises calculating the current parking force loss amount in real time while maintaining power of a control unit even when an ignition of a vehicle is turned off.

17. The method of claim 10, further comprising communicating with a portable mobile communication terminal of a driver under control of a control unit,
wherein when the current parking force loss amount is out of the reference parking force loss amount range, the communicating comprises transmitting a communication signal to the portable mobile communication terminal of the driver to allow the portable mobile communication terminal of the driver to recognize that a current parking state is unstable.

18. The method of claim 10, further comprising communicating with a portable mobile communication terminal of a driver under control of a control unit, wherein when the parking brake is re-clamped, the communicating comprises transmitting a communication signal to the portable mobile communication terminal of the driver to allow the portable mobile communication terminal of the driver to recognize that a current parking state is stable.

* * * * *